US012134103B2

(12) United States Patent
Downey

(10) Patent No.: US 12,134,103 B2
(45) Date of Patent: Nov. 5, 2024

(54) TRANSLUCENT SHOWER HEAD

(71) Applicant: ASSA ABLOY Americas Residential Inc., New Haven, CT (US)

(72) Inventor: David Downey, Lake Forest, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 223 days.

(21) Appl. No.: 17/025,015

(22) Filed: Sep. 18, 2020

(65) Prior Publication Data

US 2021/0086205 A1 Mar. 25, 2021

Related U.S. Application Data

(60) Provisional application No. 62/902,461, filed on Sep. 19, 2019.

(51) Int. Cl.
*B05B 1/18* (2006.01)
*B44F 99/00* (2013.01)

(52) U.S. Cl.
CPC .............. *B05B 1/185* (2013.01); *B44F 99/00* (2013.01)

(58) Field of Classification Search
CPC . B05B 1/185; B05B 1/18; B44F 99/00; E03C 1/0408
See application file for complete search history.

(56) References Cited

U.S. PATENT DOCUMENTS 6,076,743 A * 6/2000 Fan ........................ B05B 1/1636 239/447
6,463,658 B1 * 10/2002 Larsson ................ B05B 15/528 29/451
D599,881 S 9/2009 Wang
D637,267 S 5/2011 Suzuki
D692,527 S 10/2013 Hanna
D707,329 S 6/2014 Hanna
D715,896 S 10/2014 Hanna
D716,415 S 10/2014 Hanna
D719,240 S 12/2014 Hanna
D735,295 S 7/2015 McKeone
D740,917 S 10/2015 Hanna
D752,712 S 3/2016 Hanna
D754,283 S * 4/2016 Hanna .......................... D23/213
(Continued)

FOREIGN PATENT DOCUMENTS

CN 201208579 Y 3/2009
CN 201783410 U 4/2011
(Continued)

OTHER PUBLICATIONS

International Search Report and Written Opinion for PCT/US2020/051283, mailed Dec. 15, 2020.
(Continued)

*Primary Examiner* — Qingzhang Zhou
(74) *Attorney, Agent, or Firm* — Merchant & Gould P.C.

(57) ABSTRACT

A cap that is attachable to a shower head that includes a face portion and an opposite rear portion. The cap includes a plurality of holes extending from the face portion to the rear portion. Each hole is configured to receive a nozzle. The cap includes ornamental indicia positioned at the rear portion. The cap is at least semi-translucent, thereby allowing the ornamental indicia to be visible from the face portion of the cap.

12 Claims, 6 Drawing Sheets

(56) References Cited

U.S. PATENT DOCUMENTS

| | | | | | |
|---|---|---|---|---|---|
| D759,197 | S * | 6/2016 | Hanna | | D23/213 |
| D760,347 | S | 6/2016 | Hanna | | |
| D771,770 | S | 11/2016 | Hanna | | |
| D776,788 | S | 1/2017 | Hanna | | |
| D776,789 | S | 1/2017 | Hanna | | |
| D776,790 | S | 1/2017 | Hanna | | |
| D779,038 | S | 2/2017 | Hanna | | |
| D779,039 | S | 2/2017 | Hanna | | |
| D779,042 | S | 2/2017 | Hanna | | |
| 9,687,859 | B2 | 6/2017 | Kajuch | | |
| D834,558 | S | 11/2018 | Klosowski | | |
| D861,129 | S | 9/2019 | Logar | | |
| 10,421,082 | B2 * | 9/2019 | Luo | | B05B 1/3013 |
| D864,350 | S | 10/2019 | Logar | | |
| D913,419 | S | 3/2021 | Ladwig | | |
| D913,422 | S | 3/2021 | Ladwig | | |
| 11,000,860 | B2 | 5/2021 | Wu | | |
| D922,522 | S | 6/2021 | Lin | | |
| D938,550 | S | 12/2021 | Downey | | |
| D946,705 | S | 3/2022 | Downey | | |
| 2004/0244105 | A1 | 12/2004 | Tsai | | |
| 2004/0250851 | A1 | 12/2004 | Clark | | |
| 2005/0063772 | A1 | 3/2005 | Bladen | | |
| 2008/0185458 | A1 | 8/2008 | Holbrook | | |
| 2013/0092752 | A1 * | 4/2013 | Schumacher | | B05B 1/3013<br>239/154 |
| 2013/0232684 | A1 * | 9/2013 | Schumacher | | B05B 1/185<br>239/548 |
| 2021/0129162 | A1 | 5/2021 | Quinn | | |
| 2021/0187520 | A1 | 6/2021 | Hofman | | |

FOREIGN PATENT DOCUMENTS

| | | | | |
|---|---|---|---|---|
| CN | 102083542 A | 6/2011 | | |
| CN | 203245052 U | 10/2013 | | |
| CN | 103433159 A | 12/2013 | | |
| DE | 102011101941 | 11/2012 | | |
| EP | 1829581 | 9/2007 | | |
| EP | 2045018 A2 * | 8/2009 | | B05B 1/18 |
| JP | 3124171 U | 7/2006 | | |
| JP | 2014073352 A | 4/2014 | | |
| KR | 10-2010-0072147 A | 7/2010 | | |
| KR | 20-0460745 Y1 | 6/2012 | | |

OTHER PUBLICATIONS

High Pressure Handheld Shower Head, May 5, 2020, amazon.com, Nov. 18, 2021, URL: https://www.amazon.com/Pressure-Handheld-Settings-Showerhead-adjustable/dp/B0882NVLTV/, year 2020.

Kohler K-72595-CP Exhale B120 2.0 Gpm Multifunction Handshower, Mar. 22, 2016, amazon.com, Nov. 18, 2021, URL: https://www.amazon.com/dp/B07DAPMCB6, year 2016.

Kohler K-72419-CP Awaken G110 Multifunction Showerhead, Mar. 3, 2013, amazon.com, Nov. 18, 2021, URL: https://www.amazon.com/KOHLER-K-72419-CP-Multifunction-Showerhead-Polished/dp/B00CP7ILA4, year 2013.

Shower Head Rainfall Luxury, Nov. 1, 2015, Amazon.com, Jul. 26, 2015, URL: https://www.amazon.com/dp/B016C84YKU (Year 2015).

Rainshower Shower Showers Replacement Shower Head, Jul. 11, 2019, Amazon.com, Jul. 26, 2021, URL: https://www.amazon.com/dp/B07V4L9T6P/ref=sbl_dpx_B07NVVQ71R_0 (Year: 2019).

Kohler K-72424-BN Awaken B90 Multifunction Showerhead, May 7, 2013, Amazon.com, Jul. 26, 2021, URL: https://www.amazon.com/dp/B00CP71LX6/ref=sbl_dpx_B08D97PD9H_0 (Year: 2013).

PROFLO PFSH309GBN PROFLO PFSH309G 1.8 GPM Single Function Shower Head, Jan. 15, 2020, Amazon.com, Jul. 26, 2021, URL: https://www.amazon.com/PROFLO-PFSH309GBN-PFSH309G-Single_Function/dp/B083W64519 (Year: 2020).

https://www.amazon.com/Replacement-Nozzles-HammerHead-Showers-Silicone/dp/B085RHK9ZM/ref=sr_1_1_13?dchild=1&keywords=shower+head+nozzle&qid=1611967375&sr=8-113 (Year: 2020).

6 Sprays High Pressure Powerful Rain Shower Head, Jul. 20, 2020, Amazon.com, Jul. 26, 2021, URL: https://www.amazon.com/Pressure-Showerhead-Adjustable-Joint%EF%BC%8CFUNTAPHANTA-Experience/dp/B08D97PD9H (Year: 2020).

PCT International Preliminary Report on Patentability in Application PCT/US2020/051283, mailed Mar. 31, 2022, 7 pages.

Chinese Notice of Allowance in Application 202080072272, mailed Aug. 13, 2024, 8 pages.

* cited by examiner

SECTION A:A

TRANSLUCENT SHOWER HEAD

CROSS REFERENCE TO RELATED APPLICATION

This application claims the benefit of U.S. Provisional Application Ser. No. 62/902,461, filed Sep. 19, 2019, the disclosure of which is hereby incorporated by reference in its entirety.

BACKGROUND OF THE INVENTION

Showers have transformed from unsightly, utilitarian places of hygiene into aesthetically pleasing retreats from the stresses of life. Part of this transformation included the adoption of shower fixtures that not only perform well, but also have a decorative appeal. The shower fixtures are now chosen as part of a larger theme in the bathroom. Different design elements can be incorporated into the shower fixtures included texture, shape, color, etc.

One problem often associated with shower fixtures of the prior art is that they can be damaged from prolonged exposure to hard water. The minerals in hard water tend to form scale on the shower fixtures. This scale is unsightly and difficult to remove, detracting from the aesthetic appearance of the shower. The scale can also build up to impede water flow, thereby clogging fine shower nozzles on shower heads.

Some previous attempts to address this shortcoming include coating the fixtures with special films that are hydrophobic. Such films are costly and do not endure cleaning cycles. Other attempts include refraining from incorporating intricate designs in shower fixtures. A rough surface, engravings, or other deviations from polished surfaces attract water and cause it to remain in contact with the fixture. Once the water evaporates, the minerals are left behind, dramatically changing the aesthetic look of the fixture. As a result, smooth, polished surfaces are favored for shower fixtures as they allow the water to run off, without leaving deposits behind.

What is therefore needed is a way to add intricate designs, patterns, textures, and colors to shower fixtures while avoiding collection of water and scale deposits. What is also needed is an improved design for shower fixtures such as shower heads.

SUMMARY

The present disclosure is related to the field of shower heads. More particularly, the present disclosure is related to the field of decorative shower heads that are resistant to scale buildup.

In one aspect of the present disclosure, a cap that is attachable to a shower head is disclosed. The cap includes a face portion and an opposite rear portion. The cap includes a plurality of holes extending from the face portion to the rear portion. Each hole is configured to receive a nozzle. The cap includes ornamental indicia positioned at the rear portion. The cap is at least semi-translucent, thereby allowing the ornamental indicia to be visible from the face portion of the cap.

In another aspect of the present disclosure, a shower head is disclosed. The shower head includes an inlet for receiving water from a supply line and a plurality of nozzles. The shower head includes a cap that has a face portion and an opposite rear portion. The cap includes a plurality of holes extending from the face portion to the rear portion. Each hole corresponds to a nozzle of the plurality of nozzles such that each nozzle is inserted into a respective hole. The cap includes ornamental indicia positioned at the rear portion. The cap is at least semi-translucent, thereby allowing the ornamental indicia to be visible from the face portion of the cap.

In another aspect of the present disclosure, a shower head is disclosed. The shower head includes an inlet for receiving water from a supply line. The shower head includes a base that forms a hollow collection chamber in fluidic communication with the inlet, configured to collect the water from the supply line. The shower head includes a nozzle plate sealed to the base opposite the inlet and enclosing the collection chamber. The nozzle plate includes a plurality of nozzles and the plurality of nozzles extend from a front of the nozzle plate and form individual outlets for the collected water within the collection chamber. The shower head includes a translucent cap attached to the nozzle plate. The cap has a face portion and an opposite rear portion. The cap includes a plurality of holes that extend from the face portion to the rear portion. Each hole corresponds to a nozzle of the plurality of nozzles such that each nozzle is inserted into a respective hole. The cap includes ornamental indicia at the rear portion such that the ornamental indicia is enclosed between the face portion of the cap and the front of the nozzle plate when the cap and nozzle plate are attached to one another.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

Corresponding reference characters indicate corresponding parts throughout the several views. The exemplifications set out herein illustrate an embodiment of the invention, and such exemplifications are not to be construed as limiting the scope of the invention in any manner.

DETAILED DESCRIPTION

Figure 1:
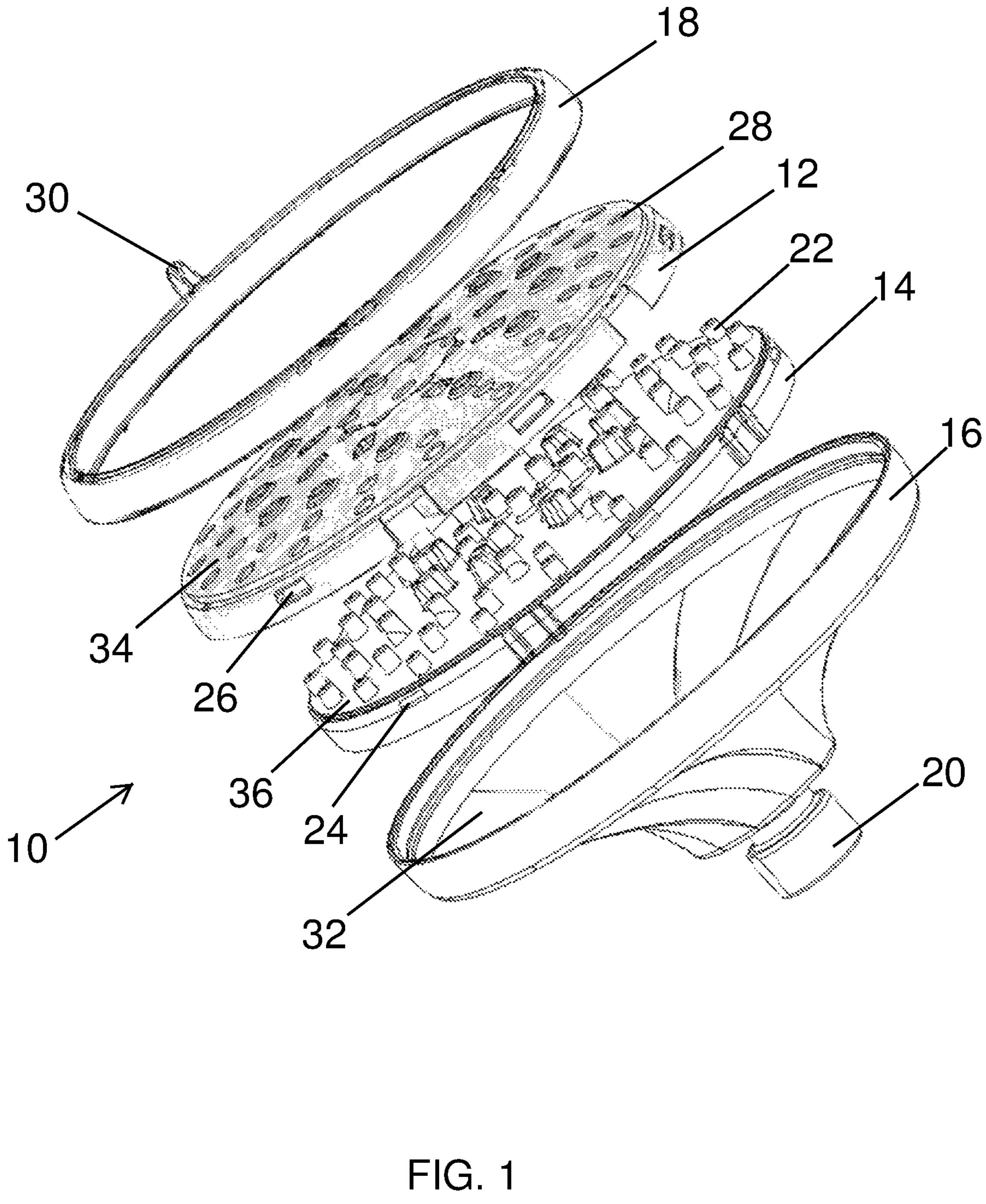
FIG. 1 shows an exploded, perspective view of the shower head according to the invention.

FIG. 1 shows a shower head 10 fully exploded. An inlet 20 may be fastened to a water supply pipe. The water may then flow into a base 16 and fill a hollow collection chamber 32. A nozzle plate 14 is affixed to the base 16 and includes a plurality of nozzles 22. The nozzles 22 allow the water within the collection chamber 32 to exit the shower head 10 in a stream. A configuration and shape of nozzles 22 is depicted in the figures, but any other nozzle shape, pattern, or layout may be employed.

The shower head 10 is configured to dispense water from a water source. Further, the shower head 10 is configured to be controlled (i.e., on/off, water volume, and water temperature) via traditional methods (e.g., a handle), and/or via gesture or voice. In some examples, the shower head 10 is any fluid dispensing device that is configured to dispense fluid therefrom. In some examples, the shower head 10 can be a faucet. The shower head 10 can have a variety of different shapes and sizes to provide a variety of different appearances having differing aesthetics.

The inlet 20, base 16, and nozzle plate 14 form the functional aspects of the shower head 10 that allow it to deliver water. The nozzles 22 may be formed out of a flexible material such as silicone, or they may be formed out of a ridged material such as ABS plastic or a metal/metal alloy.

A decorative cap 12 is used to provide an aesthetic element to the shower head 10. While the cap 12 is shown as circular, the cap 12 can be a variety of different shapes, such as square or oval shaped. The cap 12 may be formed out of any material, but is preferably formed out of an at least partially translucent material. Some examples of translucent materials are transparent polyvinyl chloride, "PVC", polycarbonate, acrylic, glass, or any other known, clear resin/composite/plastic. Forming the cap 12 out of a translucent material allows light to penetrate the thickness of the cap and thereby allows a spectator to see past a face 34 of the cap 12.

The shower head 10 may be designed such that the spectator can see a front 36 of the nozzle plate 14. In such a configuration, the nozzle plate 14 may have ornamental indicia such as, but not limited to, a coating, a distinct color, a pattern, or a design. This ornamental indicia may then be visible to the spectator through the cap 12, but sealed and sheltered from the environment, including water from the nozzles 22.

Figure 2:
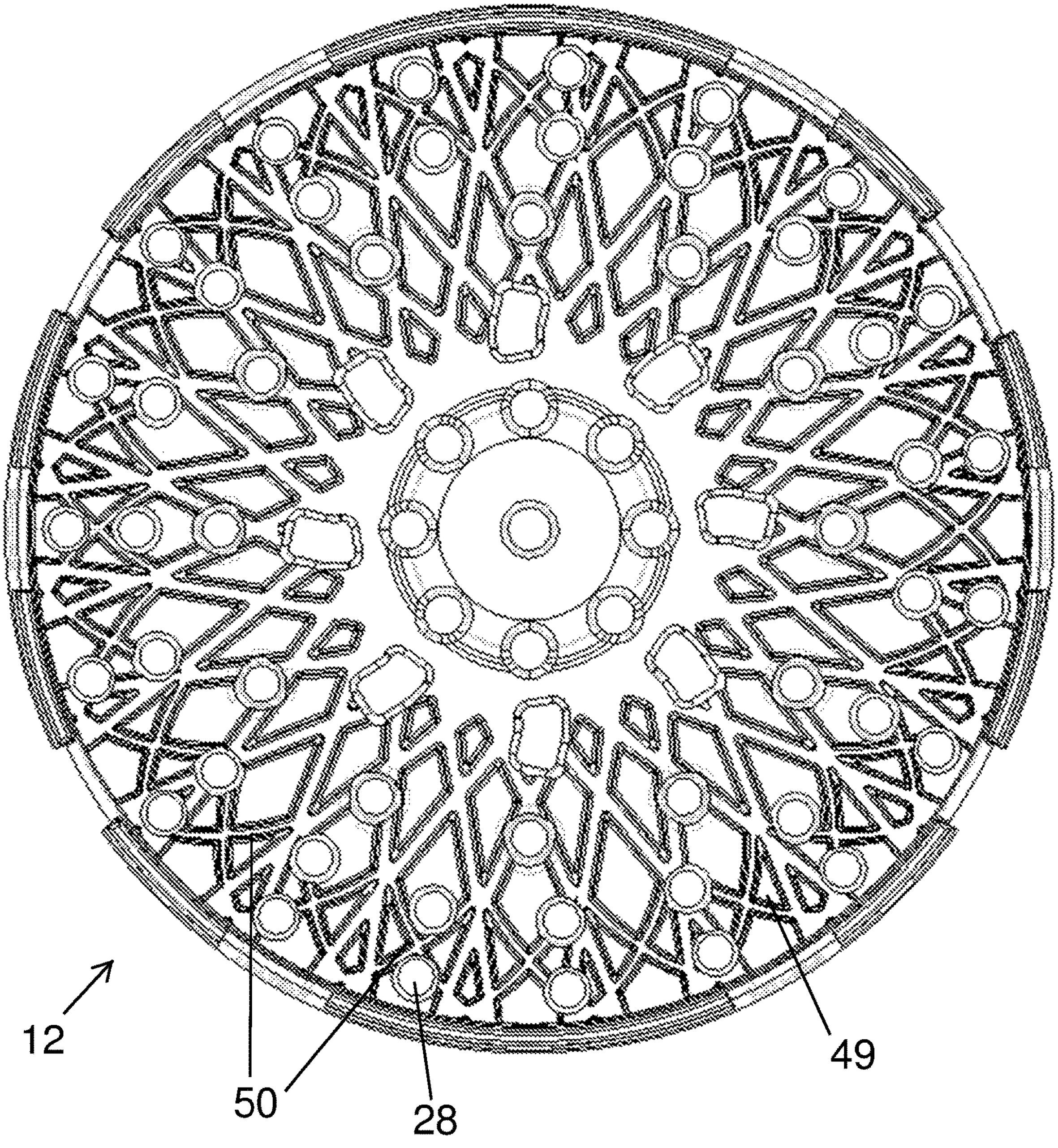
FIG. 2 shows a back view of a face of the shower head as shown in FIG. 1.

In some examples, as shown by the isolated cap 12 in FIG. 2, a back 49 of the cap 12 is coated with ornamental indicia that is an opaque coating, such as paint. The opaque coating prevents a spectator from seeing the front 36 of the nozzle plate 14. The opaque coating may be a distinct color or even include a metallic flake, glitter, or any other substance that has a distinct aesthetic appeal. As the cap 12 is translucent, a spectator will be able to see opaque coating on the back 49 of the cap 12 through the face 34 of the cap 12. The opaque coating is also sealed from the environment and any water from the nozzles 22. As a result, any surface treatment, coating, or paint, may be used on the back 49 of the cap 12 that otherwise would not be practical due to the harsh environment of a shower. Water scale, cleaning chemicals, and operator contact is known to cause wear on shower heads. By sealing the back 49 of the cap 12, this wear is prevented.

The ornamental indicia on the back 49 of the cap 12 may also include a pattern 50. In some examples, the pattern is formed in the cap 12 using a molding process. In some examples, the pattern is adhered to the back 49 of the cap 12. In some examples, the pattern 50 is machined in the cap 12. In some examples, the pattern is painted on the back 49 of the cap 12. This pattern 50 may include depressions, extensions, engravings, or the like. The pattern 50 is formed on the back 49 of the cap 12 while the face 34 is smooth. Since the cap 12 is translucent, the spectator may clearly see the pattern 50 formed in the cap 12 when the shower head 10 is assembled. The pattern 50 may be formed with or without the previously discussed opaque coating. Even with an opaque coating applied to the back 49 of the cap 12, a spectator is still able to see and appreciate the formed pattern 50. Since the formed pattern 50 and the opaque coating are sealed within the shower head 10, water scale and other debris will not be encountered, and they are preserved from wearing.

Figure 3:
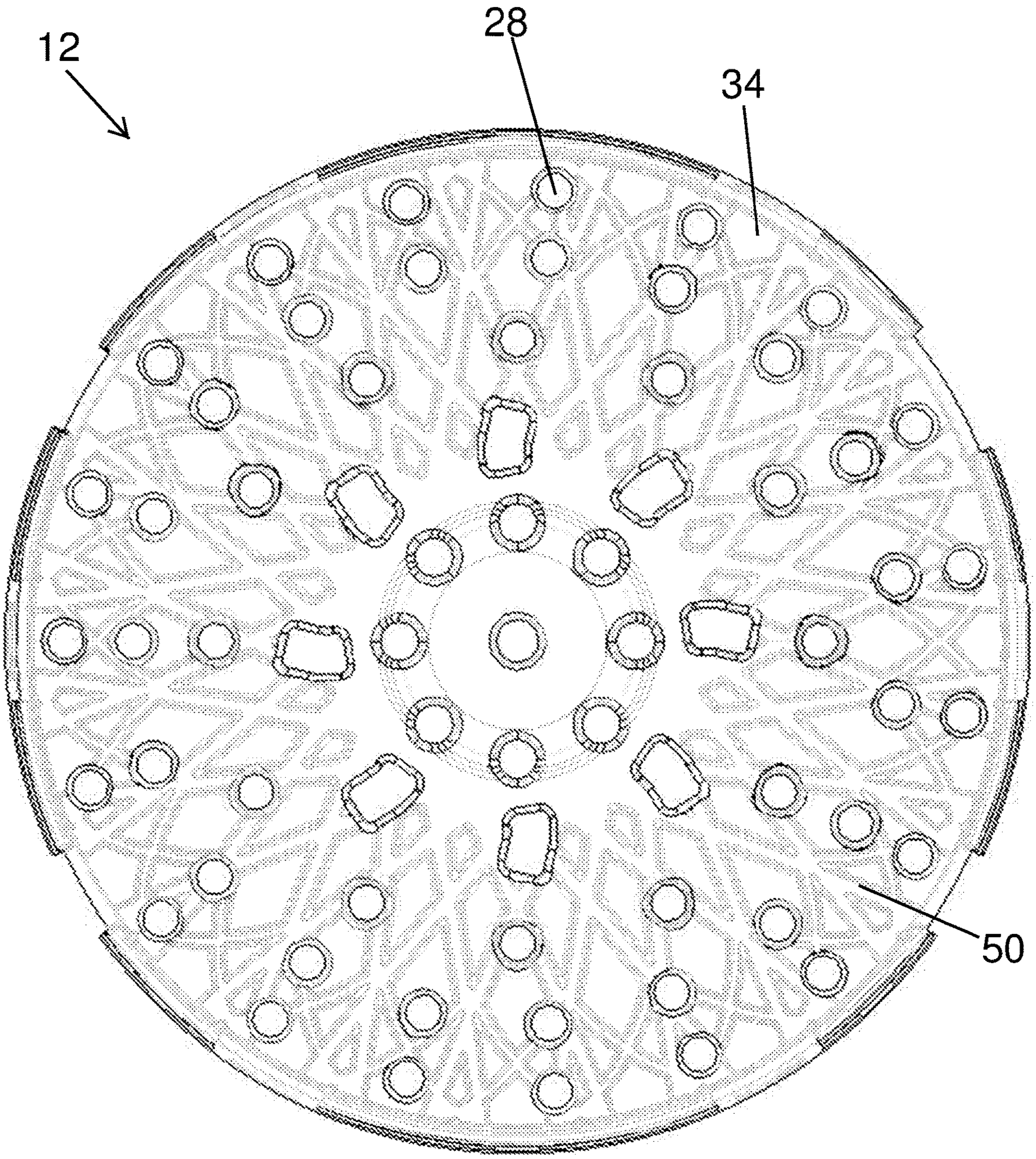
FIG. 3 shows a front view of the face of the shower head as shown in FIG. 1.
Figure 4:
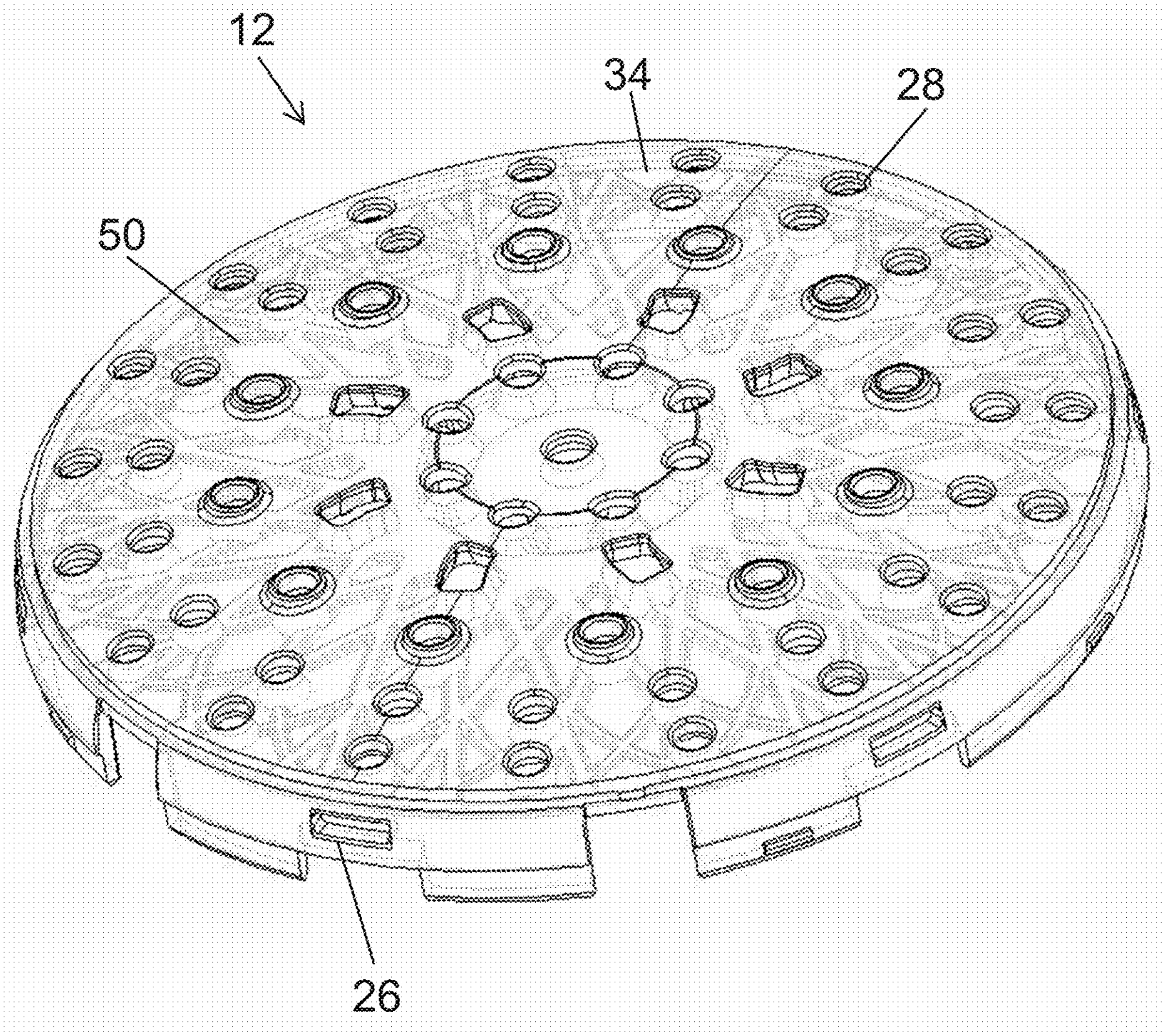
FIG. 4 shows a perspective view of the face of the shower head as shown in FIG. 2.

FIG. 3 shows the face 34 of the isolated cap 12. The pattern 50 is seen through the face 34 and through the thickness of the cap 12. The surface of the face 34, however, remains smooth as is evident in FIG. 4.

The cap 12 may include any number of through holes 28 that each receive a nozzle 22 from the nozzle plate 14. The holes 28 may be circular or any other shape. Preferably, the holes 28 have a complimentary profile to the nozzles 22. For example, if a nozzle 22 is star shaped, the hole 28 would be star shaped. In the depicted embodiment, a series of attachment features 26 (e.g., slots) are formed on the perimeter of the cap 12 and they receive tabs 24 projecting from the nozzle plate 14. The tabs 24 and attachment features 26 interact to fasten the cap 12 to the nozzle plate 14. Preferably, the nozzle plate 14 and the cap 12 are fastened together and form a water tight seal, thereby preventing water from entering any space between the cap 12 and the nozzle plate 14. In some examples, the nozzle plate 14 and the cap 12 are threaded together. It is also envisioned that a sealant may be used to bond the cap 12 to the nozzle plate 14. Alternatively, the nozzle plate 14 and the cap 12 may be bonded with a plastic welding process such as ultrasonic welding or any other known plastic bonding technique.

In order to assist in preventing water from entering any space between the cap 12 and nozzle plate 14, the individual nozzles 22 form a tight seal through the holes 28. The nozzles 22 may also extend through the holes 28 resting slightly proud of the face 34 of the cap 12. By extending the nozzles 22 proud of the face 34, an operator may easily wipe the face 34 of any debris or water and in doing so also dislodge any debris from the nozzles 22. If the nozzles 22 are made out of a flexible material such as silicone, a user can bend them or otherwise deform them slightly with a wiping action. This deformation allows any debris such as water scale to easily dislodge from the nozzles 22. Also, since the nozzles 22 extend from the face 34 of the cap 12, and because the nozzles 22 have a slight interference fit with the holes 28, water is prevented from entering any space between the nozzle plate 14 and the cap 12.

While the cap 12 is shown to cover the entire nozzle plate 14, it is envisioned that the cap 12 covers only a portion of the nozzle plate 14. Additionally, it is envisioned that the shower head 10 can include multiple caps 12 having a plurality of ornamental indicia.

In some examples, a seal may be positioned between the cap 12 and the nozzle plate 14. After the nozzle plate 14 and cap 12 are joined, a trim ring 18 can be used to seal the perimeter of the shower head 10 and conceal any joints. A tab 30 may be included to provide the operator with a location to grasp the shower head 10 when adjusting the orientation of the shower head 10 with respect to the inlet 20. Preferably the inlet 20 articulates with a joint within the base 16 thereby allowing the operator to orient the direction of a water stream exiting the nozzles 22.

Figure 5:
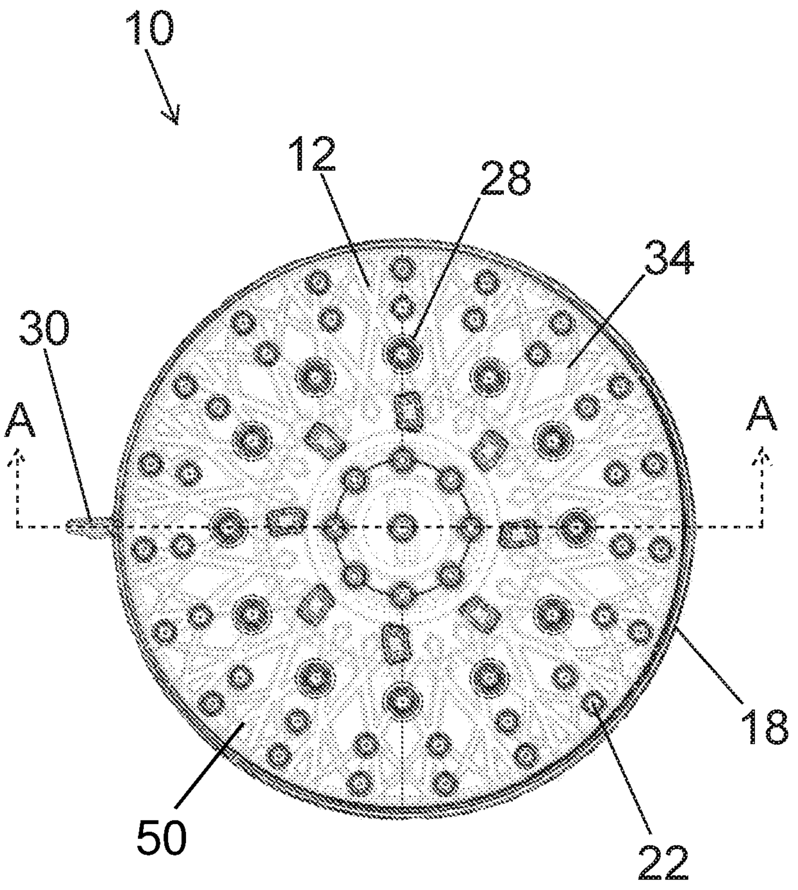
FIG. 5 shows an assembled, front view of the shower head as shown in FIG. 1.
Figure 6:
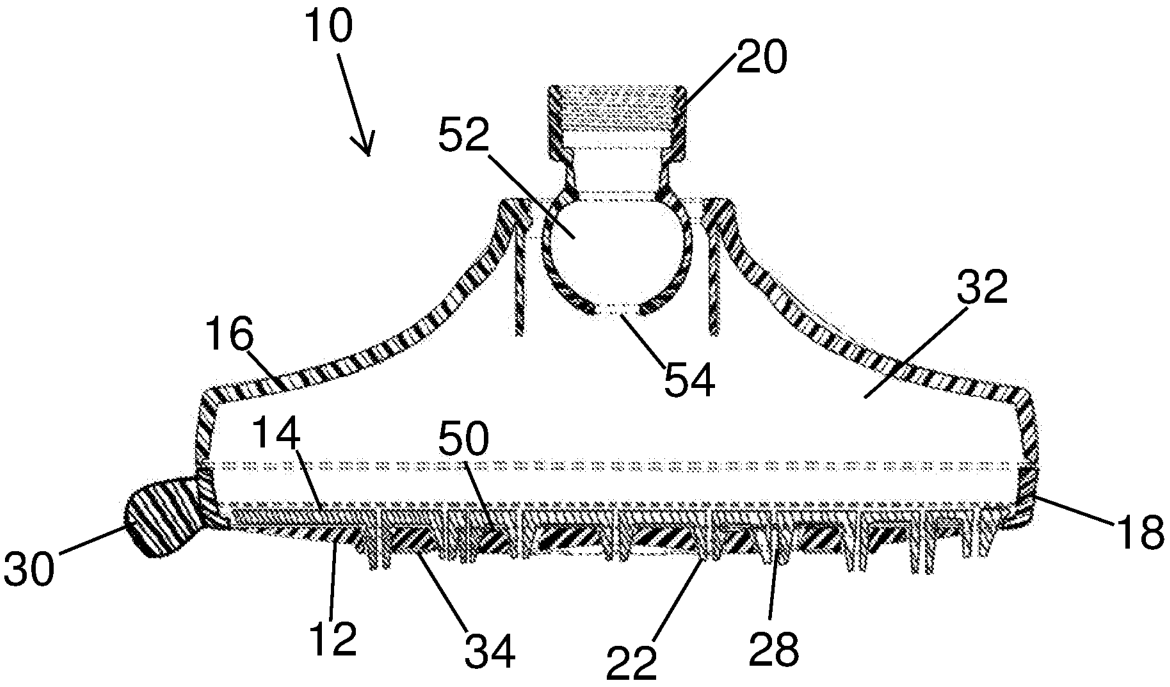
FIG. 6 shows a section view of the assembled shower head as shown in FIG. 5 along section line A:A.

Turning now to FIG. 6, a sectional view is shown of the shower head 10 along section A:A of FIG. 5. In operation, water is delivered to the shower head 10 through the inlet 20. In this example, the inlet 20 includes a ball joint 52 which allows the shower head 10 to pivot about the inlet 20 thereby allowing a user to aim the water stream. The water exits the ball joint 52 via a port 54. The water flowing out of the port 54 fills the collection chamber 32. The water then exits the collection chamber 32 through the nozzles 22 in the nozzle plate 14. Since the cap 12 is separated from the collection chamber 32 by the nozzle plate 14, water never contacts the cap 12. While there may be incidental water contact on the face 34 of the cap 12, any ornamental indicia at the back 49 of the cap 12, such as the pattern 50, is protected, and shielded, from any water.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

Examples

Illustrative examples of the shower head herein are provided below. An embodiment of the shower head may include any one or more, and any combination of, the examples described below.

In Example 1, a cap is attachable to a shower head, and the cap includes a face portion and an opposite rear portion. The cap also includes a plurality of holes extending from the face portion to the rear portion, and each hole is configured to receive a nozzle. The cap further includes ornamental indicia positioned at the rear portion. The cap is at least semi-translucent, thereby allowing the ornamental indicia to be visible from the face portion of the cap.

In Example 2, the cap of Example 1 is modified to further include attachment features configured to mate with a nozzle plate of the shower head.

In Example 3, the cap of Example 1 is modified in that the ornamental indicia is an opaque coating.

In Example 4, the cap of Example 1 is modified in that the ornamental indicia is a formed pattern.

In Example 5, the cap of Example 4 is modified in that the pattern is formed through one of a molding, machining, and painting operation.

In Example 6, the cap of Example 2 is modified in that the cap is attached to the nozzle plate of the shower head.

In Example 7, a shower head includes an inlet for receiving water from a supply line, a plurality of nozzles, and a cap having a face portion and an opposite rear portion. The cap includes a plurality of holes extending from the face portion to the rear portion, and each hole corresponds to a nozzle of the plurality of nozzles such that each nozzle is inserted into a respective hole. The cap also includes ornamental indicia at the rear portion, the cap is at least semi-translucent, thereby allowing the ornamental indicia to be visible from the face portion of the cap.

In Example 8, the shower head of Example 7 is modified to further include a base forming a hollow collection chamber in fluidic communication with the inlet configured to collect the water from the supply line.

In Example 9, the shower head of Example 7 is modified to further include a nozzle plate including the plurality of nozzles. The cap is attached to the nozzle plate. The plurality of nozzles extend from a front of the nozzle plate and form individual outlets.

In Example 10, the shower head of Example 9 is modified in that the ornamental indicia is formed opposite the face portion of the cap such that the ornamental indicia is enclosed between the face portion of the cap and the front of the nozzle plate when the cap and nozzle plate are attached to one another.

In Example 11, the shower head of Example 9 is modified in that the cap further includes attachment features configured to mate with the nozzle plate of the shower head.

In Example 12, the shower head of Example 9 is modified to further include a trim ring in contact with a circumference of the cap and configured to secure the cap to the nozzle plate.

In Example 13, the shower head of Example 7 is modified in that the ornamental indicia is an opaque coating.

In Example 14, the shower head of Example 7 is modified in that the ornamental indicia is a formed pattern.

In Example 15, the shower head of Example 14 is modified in that the pattern is formed through one of a molding, machining, and painting operation.

In Example 16, the shower head of Example 7 is modified in that the plurality of nozzles extend past the face portion of the cap.

In Example 17, a shower head includes an inlet for receiving water from a supply line and a base forming a hollow collection chamber in fluidic communication with the inlet configured to collect the water from the supply line. The shower head includes a nozzle plate sealed to the base opposite the inlet and enclosing the collection chamber/The nozzle plate includes a plurality of nozzles, the plurality of nozzles extending from a front of the nozzle plate and forming individual outlets for the collected water within the collection chamber. The shower head further includes a translucent cap attached to the nozzle plate, the cap having a face portion and an opposite rear portion. The cap includes a plurality of holes extending from the face portion to the rear portion, and each hole corresponds to a nozzle of the plurality of nozzles such that each nozzle is inserted into a respective hole. The cap includes ornamental indicia at the rear portion such that the ornamental indicia is enclosed between the face portion of the cap and the front of the nozzle plate when the cap and nozzle plate are attached to one another.

In Example 18, the shower head of Example 17 is modified to further include a trim ring in contact with a circumference of the cap and configured to secure the cap to the nozzle plate.

In Example 19, the shower head of Example 17 is modified in that the nozzle plate and the cap are fastened together and form a water tight seal, thereby preventing water from entering the space between the cap and the nozzle plate.

In Example 20, the shower head of Example 17 is modified in that the nozzle plate and the cap are sealed together.

What is claimed is:

1. A cap attachable to a nozzle plate of a shower head, a front of the nozzle plate including a plurality of nozzles formed out of a flexible material, the plurality of nozzles including one or more central nozzles, one central nozzle of the one or more central nozzles centered on the nozzle plate, and a plurality of radially outer nozzles having at least one rectangular shaped nozzle and at least one circular shaped nozzle, the cap comprising:

a face portion and an opposite rear portion, wherein an outer perimeter of the cap defines the transition between the face portion and the rear portion, and wherein the outer perimeter of the cap includes a plurality of slots configured to receive corresponding tabs projecting from the nozzle plate;

a plurality of holes extending from the face portion to the rear portion, wherein each hole is configured to receive a nozzle of the plurality of nozzles; and ornamental indicia positioned at the rear portion, wherein the ornamental indicia includes a central nozzle portion incorporating the one or more central nozzles and a pattern representative of flow channels radially extending from the central nozzle portion incorporating the plurality of radially outer nozzles, wherein the central nozzle portion indicia is different than the pattern representative of flow channel indicia and the pattern representative of flow channels starts at the at least one rectangular shaped nozzle, and wherein the ornamental indicia is formed within the rear portion of the cap and includes an opaque coating, and wherein the cap is at least semi-translucent, thereby allowing the ornamental indicia to be visible from the face portion of the cap, and wherein the cap is fastened directly to the nozzle plate with the rear portion directly facing the front of the nozzle plate to form a water tight seal such that water is prevented from entering a space between the rear portion of the cap and the front of the nozzle plate, the water tight seal formed between each hole of the plurality of holes and the respective nozzle of the plurality of nozzles and the outer perimeter of the cap and the nozzle plate.

2. The cap of claim 1, wherein the pattern is formed through one of a molding, machining, and painting operation.

3. A shower head comprising:

an inlet for receiving water from a supply line;

a nozzle plate having a front that includes a plurality of nozzles formed out of a flexible material, the plurality of nozzles including a plurality of rectangular shaped nozzles and a plurality of circular shaped nozzles, one of the plurality of circular shaped nozzles centered on the nozzle plate, the nozzle plate also including a plurality of tabs spaced around an outer perimeter of the nozzle plate;

a cap having a face portion and an opposite rear portion, the cap including a plurality of holes extending from the face portion to the rear portion, wherein each hole corresponds to a nozzle of the plurality of nozzles such that each nozzle is inserted into a respective hole forming a first water tight seal between the rear portion of the cap and the front of the nozzle plate, the cap also including an outer perimeter that includes a plurality of corresponding slots that fasten to the plurality of tabs of the nozzle plate, the outer perimeter of the cap forming a second water tight seal between the rear portion of the cap and the front of the nozzle plate, the cap fastened directly to the nozzle plate with the rear portion directly facing the front of the nozzle plate such that water is prevented from entering a space between the rear portion of the cap and the front of the nozzle plate via the first and second watertight seals; and a trim ring in contact with the outer perimeter of the cap and configured to secure the cap to the nozzle plate, wherein the trim ring seals a perimeter of the shower head at a joint between the nozzle plate and the cap, wherein the cap includes ornamental indicia at the rear portion, wherein the ornamental indicia includes a formed pattern representative of flow channels within the rear portion at the radially outer portion of the cap and starting proximate the plurality of rectangular shaped nozzles, and a second formed pattern encompassing the circular nozzle centered on the nozzle plate, and wherein the cap is at least semi-translucent, thereby allowing the ornamental indicia to be visible from the face portion of the cap.

4. The shower head according to claim 3, further comprising a base forming a hollow collection chamber in fluidic communication with the inlet configured to collect the water from the supply line.

5. The shower head according to claim 3, wherein the plurality of nozzles form individual outlets.

6. The shower head according to claim 5, wherein the ornamental indicia is formed opposite the face portion of the cap such that the ornamental indicia is enclosed between the face portion of the cap and the front of the nozzle plate when the cap and the nozzle plate are attached to one another.

7. The shower head according to claim 3, wherein the ornamental indicia further includes an opaque coating.

8. The shower head according to claim 3, wherein the pattern is formed through one of a molding, machining, and painting operation.

9. The shower head to claim 3, wherein the plurality of nozzles extend past the face portion of the cap.

10. A shower head comprising:

an inlet for receiving water from a supply line, the inlet includes a ball joint with a port;

a base forming a hollow collection chamber in fluidic communication with the port of the inlet configured to collect the water from the supply line, the base pivotable about the ball joint;

a nozzle plate sealed to the base opposite the inlet and enclosing the collection chamber, the nozzle plate including a plurality of nozzles formed out of a flexible material, wherein the plurality of nozzles extend from a front of the nozzle plate and form individual outlets for the collected water within the collection chamber, wherein the nozzle plate includes a center point axially aligned with the inlet, and wherein the plurality of nozzles include a center nozzle disposed at the center point and a plurality of radially outward nozzles relative to the center nozzle, the plurality of radially outward nozzles including at least a circular shape and a square shape, and wherein the nozzle plate also includes a plurality of tabs spaced around an outer perimeter of the nozzle plate;

a translucent cap attached to the nozzle plate, the cap having a face portion and an opposite rear portion, the cap including a plurality of holes extending from the face portion to the rear portion, wherein each hole corresponds to a nozzle of the plurality of nozzles such that each nozzle is inserted into a respective hole forming a first water tight seal between the rear portion of the cap and the front of the nozzle plate, the cap also including an outer perimeter that includes a plurality of corresponding slots that fasten to the plurality of tabs of the nozzle plate, the outer perimeter of the cap forming a second water tight seal between the rear portion of the cap and the front of the nozzle plate, wherein the cap is fastened directly to the nozzle plate with the rear portion directly facing the front of the nozzle plate such that water is prevented from entering a space between the rear portion of the cap and the front of the nozzle plate via the first and second watertight seals; and a trim ring in contact with the outer perimeter of the cap and configured to secure the cap to the nozzle plate, wherein the trim ring seals a perimeter of the shower head at a joint between the nozzle plate and the cap, wherein the cap includes ornamental indicia at the rear portion such that the ornamental indicia is enclosed between the face portion of the cap and the front of the nozzle plate when the cap and the nozzle plate are attached to one another, and wherein the ornamental indicia includes a central nozzle portion incorporating the center nozzle and a pattern representative of flow channels radially extending from the central nozzle portion incorporating the plurality of radially outer nozzles, wherein the central nozzle portion indicia is different than the pattern representative of flow channel indicia and the ornamental indicia is formed within the rear portion of the cap.

11. The shower head according to claim 10, further comprising a tab extending from the shower head for adjusting an orientation of the shower head with respect to the inlet.

12. The shower head according to claim 11, wherein the trim ring includes the tab.

* * * * *